March 19, 1940.  T. B. DARST  2,193,901
TOOL
Filed Feb. 2, 1939
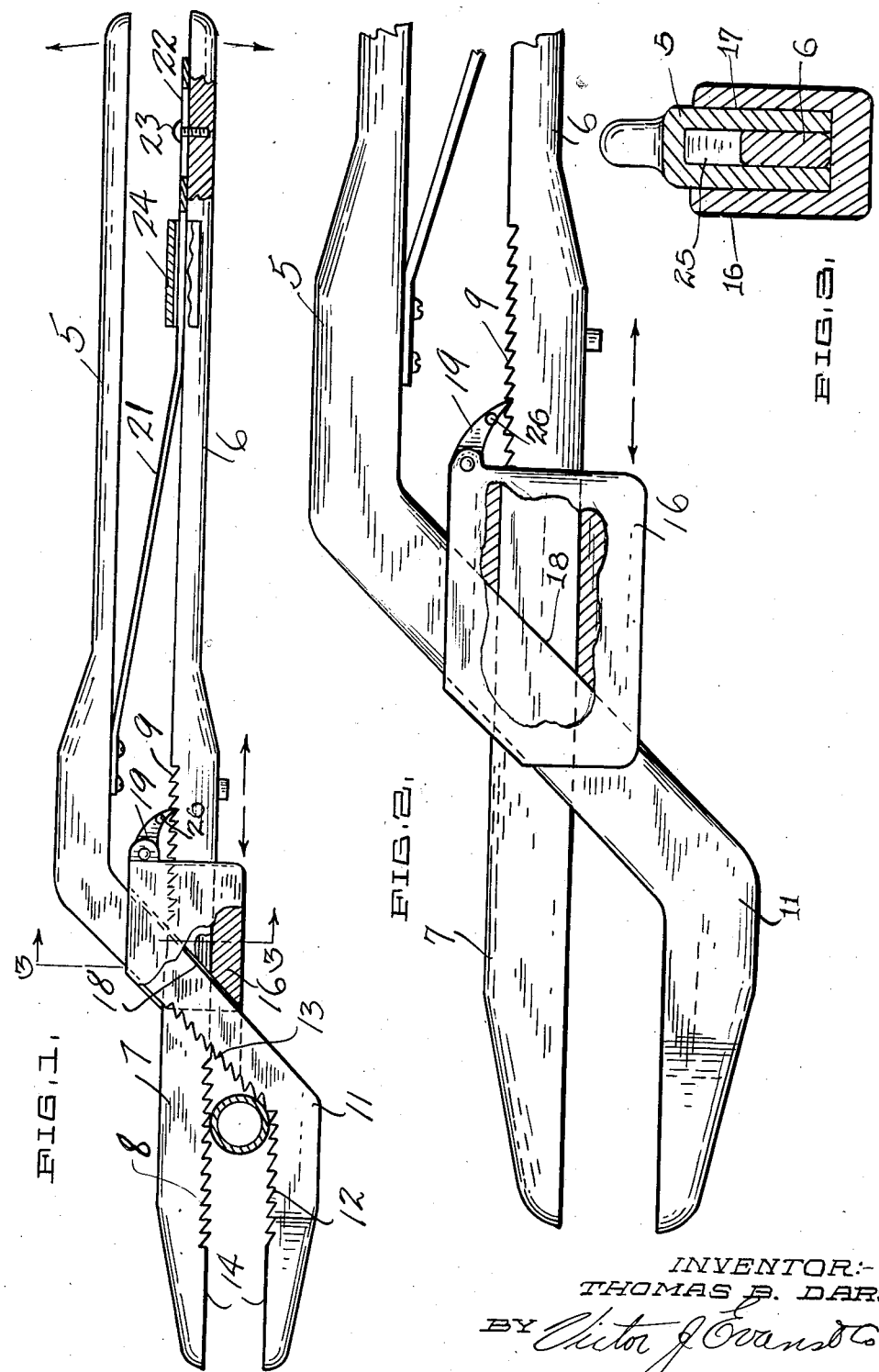
INVENTOR:-
THOMAS B. DARST.
BY
ATTORNEYS.

Patented Mar. 19, 1940

2,193,901

UNITED STATES PATENT OFFICE 2,193,901

TOOL

Thomas B. Darst, Oakland, Calif.

Application February 2, 1939, Serial No. 254,286

2 Claims. (Cl. 81—51.3)

This invention relates to improvements in tools and has particular reference to a combination tool which may act as a pair of pliers, a monkey wrench, or a pipe wrench, or tongs.

The principal object of this invention is to produce a device of this character which may be quickly adjusted to any size of pipe, nut, or sheet metal within the limits of the tool.

A further object is to produce a device of this character which is economical to manufacture, sturdy in construction, and simple to operate.

Other objects and advantages will be apparent during the course of the following description.

In the accompanying drawing forming a part of this specification and in which like numerals are employed to designate like parts throughout the same, Fig. 1 is a side elevation of my tool having a portion thereof broken away;

Fig. 2 is an enlarged fragmentary side elevation of the jaw portion; and

Fig. 3 is a cross sectional view taken on the line 3—3 of Fig. 1.

The ordinary pair of pliers consists of two hinged handles and is very limited in its ability to hold a nut, pipe, or flat sheet of metal. Also, the hinged arrangement prevents the faces of the tool from being in parallel arrangement except when the pliers are in closed position.

My device provides an arrangement wherein the faces of the tool are parallel in any of their adjusted positions.

In the accompanying drawing wherein for the purpose of illustration is shown a preferred embodiment of my invention, the numerals 5 and 6 designate handle portions, the handle 6 having a straight jaw portion 7 provided with pipe teeth 8 and ratchet teeth 9. The handle 5 has a bifurcated jaw 11 forming a slot 25 therein, and as shown in Fig. 3, the bifurcated jaw 11 fits over the jaw section 7, and this jaw section 7 is movable in said bifurcated jaw 11, said jaw 11 having teeth 12 and 13. The faces of the noses of the jaws are preferably plain, as shown at 14. A sliding member 16 has a horizontal slot 17 formed therethrough in which the jaw of the handle 5 may move. A diagonally disposed slideway 18 is also formed in the sliding member, through which the jaw section 11 of the handle 5 may also slide. A dog 19 is pivoted to the sliding member 16 and has its nose engaging the ratchet teeth 9. A spring 21 is connected to the handle 5 and has its free portion bent so as to lie parallel and bear against the handle 6. This free portion is slidable with relation to the handle 6 through a slot 22 through which a screw 23 passes into the handle 6. A guide member 24 may also be carried by the handle 6, through which the spring 21 may slide. It is, of course, obvious that the teeth 8, 12, and 13 may be eliminated, if desired, as shown in Fig. 2. A pin 26 is provided in the dog 19 so that it may be readily disengaged from the teeth 9.

When the parts are in the position of Fig. 1, it will be apparent that the spring 21 will move the jaws toward each other so that they will impinge upon any article placed therebetween, as for instance, the cross sectional representation of a pipe of the figure. The dog 19 will prevent rear movement of the parts with relation to each other.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a tool of the character described, comprising a jaw formed of a straight bar having teeth on its inner edge at one end and the opposite end forming a handle, a sliding member on said bar, means for locking the sliding member thereon against movement away from the teeth, a second jaw parallel with the first jaw and having an oblique portion sliding through the sliding member and crossing the bar and having a straight handle portion parallel with the handle of the bar, and spring means for holding the handles separated in their parallel position.

2. In a tool of the character described, comprising a jaw formed of a straight bar having work gripping teeth on its inner edge at one end and intermediately positioned ratchet teeth on its outer edge, the opposite end of the bar forming a handle, a sliding member on said bar, a pawl carried by the sliding member and engaging the ratchet teeth carried by the bar for locking the sliding member thereon against movement away from the work gripping teeth, a second jaw parallel the first jaw and having an oblique portion sliding through the sliding member and crossing the bar and having a straight handle portion parallel to the handle of the bar, and spring means for holding the handles separated in their parallel position.

THOMAS B. DARST.